United States Patent
Ghorbani et al.

(10) Patent No.: US 10,679,772 B2
(45) Date of Patent: Jun. 9, 2020

(54) ELECTRIC POWER CABLE AND A PROCESS FOR THE PRODUCTION OF THE POWER CABLE

(71) Applicant: NKT HV Cables AB, Lyckeby (SE)

(72) Inventors: Hossein Ghorbani, Malmö (SE); Peter Sunnegårdh, Kallinge (SE); Birgitta Källstrand, Västerås (SE); Carl-Olof Olsson, Västerås (SE); Ulf Nilsson, Ödsmål (SE); Per-Ola Hagstrand, Stenungsund (SE); Villgot Englund, Göteborg (SE); Emy Silfverberg, Lerum (SE); Niklas Thorn, Stenungsund (SE)

(73) Assignee: NKT HV Cables AB, Lyckeby (SE)

( * ) Notice: Subject to any disclaimer, the term of this patent is extended or adjusted under 35 U.S.C. 154(b) by 0 days.

(21) Appl. No.: 15/739,602

(22) PCT Filed: Jun. 23, 2015

(86) PCT No.: PCT/EP2015/064014
§ 371 (c)(1),
(2) Date: Dec. 22, 2017

(87) PCT Pub. No.: WO2016/206715
PCT Pub. Date: Dec. 29, 2016

(65) Prior Publication Data
US 2018/0190409 A1  Jul. 5, 2018

(51) Int. Cl.
*H01B 9/02* (2006.01)
*H01B 7/288* (2006.01)
(Continued)

(52) U.S. Cl.
CPC .......... *H01B 7/288* (2013.01); *H01B 7/0208* (2013.01); *H01B 7/2806* (2013.01);
(Continued)

(58) Field of Classification Search
CPC .................................................. H01B 9/027
(Continued)

(56) References Cited

U.S. PATENT DOCUMENTS 3,843,830 A * 10/1974 Priaroggia ............... H01B 9/02
                                                        174/102 D
4,626,619 A * 12/1986 Uematsu .............. H01B 7/2825
                                                        174/106 R
(Continued)

FOREIGN PATENT DOCUMENTS

CN    101165821 A    4/2008
CN    202917207 U    5/2013
(Continued)

OTHER PUBLICATIONS

Powers W. F. Ed—Institute of Electrical and Electronics Engineers: "An overview of different designs of water resistant cable", Published: Oct. 4, 1992, New York, pp. 2060-2063 4 Pages.
(Continued)

*Primary Examiner* — Chau N Nguyen
(74) *Attorney, Agent, or Firm* — Whitmyer IP Group LLC (57) ABSTRACT

An electric power cable and a process for the production of the cable including a metal conductor and an electric insulation system surrounding the conductor coaxially and radially outwards of the conductor having improved electric properties. The insulation system includes an inner semi-conducting layer surrounded radially outwards by an insulation layer and wherein the insulation layer is surrounded radially outwards by an outer semi-conducting layer. The electric power cable further includes an inner water blocking material arranged in the conductor and/or to surround the conductor radially outwards and an outer water blocking material arranged radially outwards from the insulation system. An inner barrier layer is arranged as a diffusion hindering layer between the inner water blocking material (Continued)

and the insulation system and an outer barrier layer is arranged as a diffusion hindering layer between the insulation system and the outer water blocking material.

9 Claims, 4 Drawing Sheets

(51) Int. Cl.

| | | |
|---|---|---|
| *H01B 7/28* | (2006.01) | |
| *H01B 7/282* | (2006.01) | |
| *H01B 7/02* | (2006.01) | |
| H01B 7/14 | (2006.01) | |
| H01B 3/44 | (2006.01) | |
| H01B 13/00 | (2006.01) | |
| H01B 13/14 | (2006.01) | |

(52) U.S. Cl.
CPC ........... *H01B 7/2825* (2013.01); *H01B 9/027* (2013.01); *H01B 3/441* (2013.01); *H01B 7/14* (2013.01); *H01B 13/0016* (2013.01); *H01B 13/14* (2013.01); *Y02A 30/14* (2018.01)

(58) Field of Classification Search
USPC .................................................... 174/120 SC
See application file for complete search history.

(56) References Cited

U.S. PATENT DOCUMENTS

| | | | | |
|---|---|---|---|---|
| 4,963,695 A | * | 10/1990 | Marciano-Agostinelli | ................. B29C 47/0016 156/48 |
| 5,010,209 A | * | 4/1991 | Marciano-Agostinelli | ................. H01B 7/2813 174/102 SC |
| 6,242,692 B1 | * | 6/2001 | King | ...................... H01B 7/288 174/36 |
| 7,381,900 B2 | * | 6/2008 | Bremnes | .................. H01B 7/14 174/102 R |
| 2013/0168126 A1 | * | 7/2013 | Kuchta | .................. H01B 7/361 174/102 SC |

FOREIGN PATENT DOCUMENTS

| | | | |
|---|---|---|---|
| CN | 203260362 U | | 10/2013 |
| CN | 203941756 U | | 11/2014 |
| FR | 2378338 | * | 8/1978 |
| JP | S59125018 U | | 8/1984 |
| JP | H10172358 A | | 6/1998 |
| JP | 2013004232 A | | 1/2013 |
| WO | 2015041885 A1 | | 3/2015 |

OTHER PUBLICATIONS

International Preliminary Report on Patentability Application No. PCT/EP2015/064014 Completed Date: Oct. 11, 2017 8 pages.
International Search Report & Written Opinion of the International Searching Authority Application No. PCT/EP2015/064014 Completed Date: Mar. 17, 2016; dated Mar. 29, 2016 14 pages.
Written Opinion of the International Preliminary Examining Authority Application No. PCT/EP2015/064014 dated May 11, 2017 6 pages.
Chinese Office Action & Translation Application No. 20150081176.7 Completed Date: Mar. 14, 2019 16 Pages.
Japanese Office Action and Translation Application No. 2017-565791 dated Aug. 6, 2019 11 pages.

* cited by examiner

ELECTRIC POWER CABLE AND A PROCESS FOR THE PRODUCTION OF THE POWER CABLE

TECHNICAL FIELD

The present invention relates to an electric power cable and to a process for the production of an electric power cable as defined in the appended claims.

BACKGROUND

High voltage electric power cables are used to transmit electric power with medium or high voltage. The cables normally comprise a conductor and a polymeric insulation system that surrounds the conductor. Electric power cables that can be buried into the ground are called land cables. Electric power cables that can be buried into a sea bed which can freely extend between two fixing points in sea water are called submarine, sea water or underwater power cables. Underwater power cables are used today in an increasing amount due to the increased need of power transfer from for example offshore energy sources, including offshore renewable energy plants, such as wind power plants. Also the length for power transfer cables is increasing since there is a need to interconnect different regional electrical transmission networks to allow global trading of energy. Areas where energy is on the other hand needed and on the other hand produced may also be remote from each other which further increases a need for safe power transfer.

In order to meet the demands for safe power transfer, protection of the insulation systems need to be of high quality to ensure correct electrical and mechanical behaviour during the transmission of electric power. To electrically insulate the conductor, an insulation system including semi-conducting and insulating polymeric layers is arranged to surround the conductor. Unless the power cables are appropriately insulated, significant leakage currents will flow in the radial direction of the cables, from the conductor to the surrounding grounded screen. To protect the insulation system and the conductor of the high voltage power cable, metal laminates or e.g. extruded lead sheath can be provided around the insulation system as a water barrier. A polymer jacket may then be applied on top of the laminate or sheath. High voltage cables are often also include water blocking tape (WBT) also known as swelling tape that surrounds the insulation system of the cable. The water blocking tape is mainly provided to stop longitudinal spreading of water in the cable in case the cable is damaged. The water blocking tape includes a hygroscopic, i.e. water absorbing material that swells in contact with water and prevents leakage of water in longitudinal (and radial) direction of the cable so that the damaged portion of the cable can be minimized.

The use of water blocking materials have been discussed in the prior art. Publication "IEEE Transactions of Industry Applications, Vol. 29, No. 5, September/October 1992; W. F. (Buddy) Power, Jr; "An overview of Water-Resistant Cable designs" discloses the use of plastic compounds and water-absorbing materials within conductor strands to achieve longitudinal water blocking in cables. The document also discloses the use of encapsulating jackets and metallic laminated tapes as water blocking materials.

However, even though satisfactory water blocking characteristics have been achieved by the use of e.g. water blocking tapes, it has been noticed that the water blocking tapes can have a negative impact on the electrical performance of high voltage direct current (HVDC) power cables. Substances originating from the water blocking tapes can migrate into the insulation giving rise to the electrical DC conductivity in the insulation. This will increase the dielectric losses in the cable and thus increase the risk for thermal runaway. Thus, even though there are known solutions for water-resistant cable designs there is still a need to improve the known designs.

SUMMARY

It is an object of the present invention to provide a cable design and a method for the production of the cable design that minimizes the problems with the prior art cable designs with regard to diffusion of chemicals into the insulation system. Especially, it is an object to minimize electrical DC conductivity in the insulation, and thus decrease the associated problems such as the dielectric losses in the cable and the risk for thermal runaway.

It is a further object of the present invention to increase the robustness and quality of extruded DC cables.

It is a still further object to improve electrical field distribution in the insulation under DC voltages.

Further, it is an object to provide for possibility to reach higher voltages and/or higher operation temperatures.

According to the present invention the objects above are attained by the present electric power cable as defined in the appended claims.

The objects above are attained by an electric power cable comprising a metal conductor and an electric insulation system surrounding the conductor coaxially and radially outwards of the conductor. The insulation system comprises an inner semi-conducting layer surrounded radially outwards by an insulation layer and wherein the insulation layer is surrounded radially outwards by an outer semi-conducting layer. The electric power cable further comprises an inner water blocking material arranged in the conductor and/or to surround the conductor radially outwards and an outer water blocking material arranged radially outwards from the insulation system. According to the invention, an inner barrier layer is arranged as a diffusion hindering layer between the inner water blocking material and the insulation system. Further, an outer barrier layer is arranged as a diffusion hindering layer between the insulation system and the outer water blocking material.

By introducing an intermediate barrier layer between the water blocking material and the inner semiconducting layer of the cable it is possible to block or hinder the diffusion of mobile chemical substances from the water blocking material which may negatively affect the electrical DC conduction properties of the insulation system. Especially, when the first, inner, barrier layer is placed between the inner water blocking material and the inner semi-conducting layer it is possible to hinder the migration of substances originating from the inner water blocking material during manufacturing of the cable. In the same way, the outer barrier layer prevents diffusion from the outer water blocking material to the insulation system. This especially in view that the temperature of the cable during extrusion and curing of the insulation system is elevated, which leads to increased migration of substances from the water blocking materials that can deteriorate the electrical properties of the insulation system. Thus, the barrier layers functioning as diffusion hindering layers are essential in improving the electrical properties of the cable and e.g. in decreasing the DC electrical conductivity in the insulation system of the cable.

According to one aspect of the invention, the inner barrier layer and the outer barrier layer are arranged to encapsulate the insulation system. In this way, diffusion of chemicals from the inside and the outside of the insulation system can be hindered by the barrier layers.

The inner and/or the outer water blocking material may comprise a water blocking tape (WBT). Water blocking tapes are commonly used in connection with electric cables and can be applied to the cable construction in a simple way. The water blocking tape may have semi-conducting property. In this way, the electric properties of the cable are not affected negatively. Further, the water blocking tape preferably comprises a water swellable material, whereby water protection in axial direction of the cable can be obtained.

In the electric power cable the conductor can be stranded. In this case, the inner water blocking material can comprise a water-absorbent powder arranged in the conductor as powder or the water-absorbent powder may be included in the conductor by means of yarns or tapes comprising the powder.

According to one embodiment of the invention, the conductor is in direct contact with a conductor tape and surrounded radially outwards by the conductor tape. In this way, the conductor tape can shield the conductor e.g. during manufacturing process.

According to one variant of the invention, the conductor tape can constitute the inner barrier layer which functions as a diffusion hindering layer. In this way, a simple construction for the cable can be provided.

According to a further embodiment, the inner water blocking material may comprise a water blocking tape which surrounds the conductor radially outwards and wherein the water blocking tape is surrounded radially outwards by an inner barrier layer which functions as a diffusion hindering layer. By this construction, effective water blocking can be achieved. In addition to the inner barrier layer, the conductor may be surrounded by a conductor tape which provides an additional diffusion barrier. By including both the conductor tape, the water blocking tape and an inner barrier layer, a further improved water blocking capability can be obtained while diffusion of mobile chemical substances from the water blocking tape can be blocked into the insulation system.

The inner and/or the outer barrier layer may comprise or consists of any material being capable of hindering diffusion of mobile chemical substances from the water blocking tape. For example, the inner and/or the outer barrier layer may comprise a conductor tape or a metallic laminate. Conductor tapes are commonly used in power cables and therefore, a material that is proven to function in power cables can be provided, whereby a simple construction and manufacturing process for the power cable may be provided. Metallic laminates could also be used as the inner and/or the outer barrier layer, whereby efficient diffusion barrier can be provided.

The inner semi-conducting layer, the insulation layer and the outer semi-conducting layer may comprise a polyolefin-based base polymer. According to one embodiment, the base polymer in the layers of the insulation system, i.e. the inner semi-conducting layer, the insulation layer and the outer semi-conducting layer, comprises or consists of a polyethylene-based base polymer. Polyethylene-based base polymers can provide a flexible power cable with good mechanical properties. To further improve the mechanical properties of the polyethylene-based base polymer it can be cross-linked.

The electric power cable is suitably a high voltage direct current cable. Suitably, the electric power cable is a submarine cable, even though it can also be used as a land cable.

The objects mentioned above are also attained by a process for the production of an electric power cable comprising the steps of:

i) providing a conductor optionally comprising a water-absorbent material;
ii) applying a conductor tape to surround the conductor radially outwards in case the conductor is stranded and optionally applying a conductor tape to surround the conductor radially outwards in case the conductor is solid;
iii) applying a water blocking tape to surround the conductor radially outwards in case the conductor is not surrounded by a conductor tape and optionally applying a water blocking tape to surround the conductor radially outwards in case the conductor is surrounded by a conductor tape;
iv) in case a water blocking tape is applied in step iii) applying an inner barrier layer as a diffusion hindering layer radially outwards of the water blocking tape;
v) extruding an inner semi-conducting layer comprising a base polymer and to surround the conductor radially outwards;
vi) extruding an insulation layer comprising a base polymer to be in contact with the inner semi-conducting layer and to surround the inner semi-conducting layer radially outwards;
vii) extruding an outer semi-conducting layer comprising a base polymer, to be in contact with the insulation layer and to surround the insulation layer radially outwards;
viii) applying an outer barrier layer as a diffusion hindering layer radially outwards of the outer semi-conducting layer; and
ix) applying an outer water blocking material to surround the outer metallic layer radially outwards.

According to one embodiment of the invention, the base polymer consists of a polyethylene-based polymer, whereby easy manufacture of the power cable can be obtained, while good mechanical properties can be provided for the cable.

According to one variant, a cross-linking agent is added to the polyethylene-based base polymer prior to extrusion. In this way the mechanical properties of the insulation system can be further improved.

The extrusion steps v)-vii) can be performed simultaneously or in sequence, which renders the process flexible.

The process may further comprise a step of curing at a curing temperature of from 150-350° C. In this way the mechanical properties of the cable can be modified and for example cross-linking procedure can be carried out. The process may further comprise after curing a step of heat-treating and degassing the cable to remove cross-linking by-products.

Preferably, the outer water blocking material is water blocking tape, which can be easily applied to the cable with already existing equipment. Thus, a simple manufacturing process can be provided.

Further aspects and advantages will be now described in the below detailed description with reference to the appended drawings.

DETAILED DESCRIPTION

Electric power cables, also called electric transmission power cables, are aimed for transmitting electric power. The demands with regard to electric and mechanical properties are increasing due to the increased demand for electricity and due to the long distances electricity needs to be transmitted. The electric power cable according to the present invention is a direct current power cables, such as high voltage direct current (HVDC) cable, suitable for use as a land cable or a submarine cable.

The electric transmission power cables comprise a conductor, which is usually mainly constituted by a metal such as copper or aluminium. The conductor may be stranded, i.e. it comprises a plurality of metallic strands bundled together. Stranded conductors render the conductors flexible and easy to handle. The conductor may also be solid. The conductor is surrounded by an electric insulation system which comprises a first, inner, semi-conducting layer, insulation layer and a second, outer, semi-conducting layer. An insulation layer is thus located between the semi-conducting layers.

Normally, the conductor has a generally circular cross section, even though alternative shapes might be conceived. The radially surrounding electric insulation system with insulation and semi-conducting layers usually has a cross-section with an outer peripheral shape corresponding to the outer peripheral shape of the conductor, normally a generally circular outer periphery, and the insulation system surrounds the conductor radially and concentrically. In this way uniform insulation in the cable can be obtained and electrical properties of the cable can be improved.

The electric power cables may be underwater or submarine power cables or the cables may be land cables. The cables are preferably power transmission cables having a rated voltage of 50 kV or higher, and is thus suitable for use as a high voltage transmission power cable. Suitably, the electric power cable is a submarine cable.

In the insulation system, the insulation layer or layers should have insulation properties and essentially no conductivity or very low conductivity. The semi-conducting layer or layers can be rendered semi-conducting by using for example fillers having conducting properties.

Insulation material resists electricity. The conductivity of the insulation material may be for example of from about $1*10^{-8}$ to about $1*10^{-20}$ S/m at 20° C., typically from $1*10^{-9}$ to $1*10^{-16}$, depending of the magnitude of the electric field.

Semi-conducting material has an electrical conductivity that is lower than the conductivity of a conductor but which is not an insulator. The conductivity of the semi-conducting material may be typically larger than $10^{-5}$ S/m at 20° C., such as up to about 10 or $10^2$ S/m. Typically, the conductivity is less than $10^3$ S/m at 20° C.

By conductivity is meant the property of transmitting electricity. The conductivity of a conducting material is more than about $10^3$ S/m at 20° C. Basically there is no upper limit, but in practical solutions the upper limit is about $10^8$ S/m at 20° C.

Water blocking materials, such as water blocking tapes, provide longitudinal water tightness in power cables, meaning that in case layers protecting the cable become damaged, the water blocking tape swells in contact with water and prevents leakage of water in longitudinal direction of the cable so that the damaged portion of the cable can be minimized. The purpose of the tapes is to absorb possible water and avoid the further leakage of water. The presence of water would be detrimental for the cable during service.

Water blocking materials in general comprise water absorbent inorganic or organic materials. Preferably, the water blocking material is water swellable and also hygroscopic, meaning that it can absorb water from the air. Such materials can be for example superabsorbent polymers (SAP) which are polymers that can absorb and retain large amounts of a liquid relative to their own mass, such as up to about 500% its own weight and become up till 99.9% liquid, i.e. the SAP-material is water swellable. In saline conditions, the absorption capacity is lowered, and can be up to about 50% SAP's own weight. When such water absorbing materials absorb water they will become a viscous gel. This gel will then block the ingress of more water into the cable.

The water absorbent materials can be provided for example as powders. The water absorbent powders may be applied directly into interstices of a stranded conductor or they may be included in the conductor by means of yarns or tapes and placed in interstices of the stranded conductors. For example, the yarns can be placed longitudinally in the direction of the conductor strands or the yarns may be wound around one or more conductor strands. Alternatively, the conductor may be surrounded by a water blocking material in form of a tape which comprises the water absorbing material, such as SAP. The tape can further comprise one or several layers of carrier material, such as nonwoven material comprising e.g. polyester and/or polyacrylate or any other suitable inert nonwoven material. Depending on the placement of the water blocking tape, it can have semi-conducting or insulating properties. There are several types of water blocking tapes commercially available.

The inner and/or the outer barrier layers are arranged as diffusion hindering layers. By diffusion is meant the transfer of atoms, ions or molecules by their random motion from one substrate to another, for example from the water blocking material, e.g. the water blocking tape, to the insulation system. By mobile chemical substances are meant chemicals (ions or molecules) that are able to diffuse from a substrate, e.g. in this case from the water blocking material or the water blocking tape. The barrier layer hinders the diffusion, which means that the barrier layer has a functionality that prevents diffusion of mobile chemical substances, e.g. from the water blocking material to the insulation system. This functionality could be provided by a density or compactness of the material which is sufficient to prevent the ions or molecules to travel through the barrier layer. Such materials could be for example polymeric, ceramic and/or metallic layers, for example metallic layers comprised in laminates. The metallic layers could be for example aluminium or copper layers. The thickness of such metallic layers could be from about 1 µm and up to about 10 mm. Even thinner or thicker layers could be possible, but for practical reasons the thickness should be such that the barrier material is still easy to handle in the manufacturing process. Metallic layers have been found to function properly as diffusion layers. Also, metallic layers have conductive properties, whereby they are suitable for use in electric power cables. However, also polymeric material layers or ceramic material layers could be used as barrier layers, as long as they have functionality to prevent diffusion of desired chemical substances between to different substrates. The polymeric material can be based on neat polymers, such as polyamide e.g. commercially known Nylon, polyester, cellulose-based products, such as paper or paperboard or polymer blends. In case of non-metallic barrier, the polymeric material or the ceramic material preferably comprises additives that render the material conductive and/or denser so as to improve the diffusion blocking properties of the barrier. Laminates comprising one or more metallic layers and one or more polymeric layers comprising one or more polymeric materials as described above could also be usable as diffusion hindering layer. The barrier layer preferably comprises or consists of a conducting tape or a metallic laminate, such as aluminium laminate.

The insulation system comprises an inner semi-conducting layer surrounded radially outwards by an insulation layer. The insulation layer is surrounded radially outwards by an outer semi-conducting layer. The layers of the insulation system comprise a polymeric material and suitably a base polymer which is polyolefin-based, such as polypropylene and/or polyethylene-based. The polymeric material of the layers is extruded to provide semi-conducting and insulating layers to surround the conductor. In the semi-conducting layers, a conductive filler or additive is used to render the layers semi-conductive, and in the insulation layer no conductive filler or only a small amount that does not render the insulation layer conductive is used. The conductive particles may be of any kind, such as metallic conductive filler particles or carbon black. The content of the particles may vary e.g. between 10 to 40% by weight, based on the total weight of the semi-conducting layer. Carbon black is often used due to its stability also at high temperatures.

The base polymer is also usually cross-linked during a curing procedure at an elevated temperature to render the polymer sufficient mechanical strength. The cross-linking agent for the base polymer may be any cross-linking agent suitable for use in connection with a polyethylene polymer or copolymer thereof, such as a peroxide-based, silane-based cross-linking agent or azo-compounds. The cross-linking may also be performed by radiation. The amount of the cross-linking agent can be from 0.1-2.0% by weight, based on the weight of the base polymer, to ensure sufficient cross-linking. After extrusion and cross-linking, the cables are usually heat-treated which helps to remove a portion of the cross-linking by-products from the cable insulation system.

In the insulation system, the polymeric material or the base polymer of the semi-conducting layers and the insulation layers comprises or consists of a polyolefin-based polymer and preferably a polyethylene-based polymer and can be selected from low density polyethylene, ultra-low density polyethylene, linear low density polyethylene, high density polyethylene and ultra-high density polyethylene or mixtures thereof. Preferably, the polyethylene polymer is low density polyethylene. The polymeric material renders the insulation system relatively thermally stable while an effective insulation property is obtained. Also, polyethylene is a material that is softer and more flexible than other olefin-based polymers, such as polypropylene. The base polymer in all layers of the insulation system is preferably the same so that the production process can be easily controlled. In this way, only different fillers and additives need to be added, and the base polymer per se needs not to be modified.

Different additives and fillers can be added to the base polymer to render the polymeric material desired properties. Additives may be for example stabilizers such as antioxidants, nucleating agents, inorganic fillers, cross-linkers, cross-linking boosters such as 2,4,6-triallyl cyanurate, scorch retard agents and flame retardants. Stabilizers, particularly antioxidants prevent negative effects of oxidation.

The conductor and the insulation system can be surrounded by further material or layers of material. Further materials and layers may have different tasks such as that of holding the different cable parts together, giving the cable mechanical strength and protecting the cable against physical as well as chemical attacks, e.g. corrosion. Such materials and layers are commonly known to the person skilled in the art. For example, such further materials may include armouring, for example steel wires, or sheath-like barriers to provide protection or a water barrier for the cables.

In high voltage DC power cables the water blocking material, such as a water blocking tape (WBT), can be applied in the conductor, over the conductor and over the outer semiconducting layer of the cable. As mentioned above, it has been discovered that diffusion of mobile chemical substances from for example the water blocking tape into the insulation may cause substantial increase in electrical DC conductivity of the insulation. This can disturb the quality and/or function of cables, and therefore it is desirable to minimize these effects. It is therefore very important to minimize the impact from the water blocking tapes to be able to reach the highest voltage levels. According to the present invention, the effects are minimized by minimizing the diffusion of the chemicals by means of at least a first inner barrier layer functioning as a diffusion hindering layer. The first inner barrier layer is arranged between a first inner water blocking material and the insulation system, whereby the diffusion from the inner water blocking material to the insulation system is hindered. This is especially advantageous during the manufacture of the cable. The insulation system is extruded at an elevated temperature to cover the conductor. Due to the elevated temperature, the migration of chemical substances from the water blocking material increases. In the prior art solutions, the water blocking tape has been arranged directly in contact with the inner semi-conducting layer, whereby it has been easy for the chemical substances to migrate into the insulation system and thereby deteriorate the quality of the insulation system. Due to the barrier layer functioning as a diffusion hindering layer the migration of chemical substances is hindered and thus the negative effects of these substances can be essentially decreased or eliminated.

In a similar way as in connection with the inner water blocking material, further chemical substances have been able to migrate to the insulation system from an outer water blocking material arranged to surround the outer semi-conducting layer of the insulation system. According to the present invention, the insulation system is sheltered from the migration or diffusion of chemical substances from the outer water blocking material to the insulation system by means of an outer barrier layer arranged between the outer water blocking material and the outer semi-conducting layer of the insulation system. In this way, the insulation system can be encapsulated between the inner and outer diffusion hindering layers and thus maximal protection against hazardous chemicals affecting the electrical properties of the insulation system can be provided. In one variant of the invention, the inner diffusion hindering layer is in contact with the inner semi-conducting layer and the outer diffusion layer is in contact with the outer semi-conducting layer, whereby the insulation system is encapsulated and can be protected in an efficient way.

The cable design according to the embodiments of the present invention is now further described with reference to the appended drawings.

Figure 1:
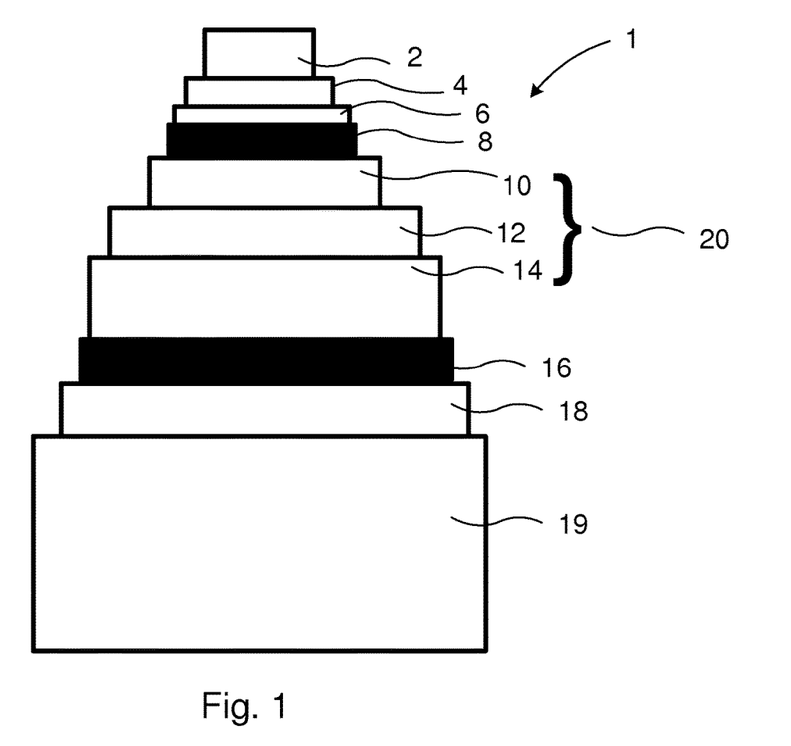
FIG. 1 is a side view of an electric power cable according to a first embodiment of the present invention.
Figure 2:
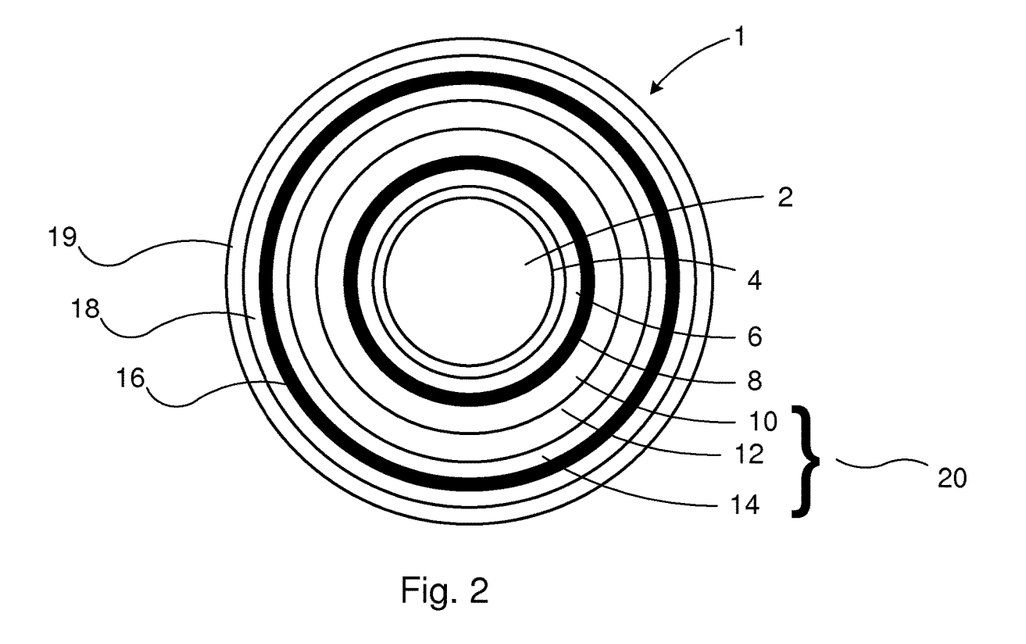
FIG. 2 is a cross-section of an electric power cable according to a first embodiment of the present invention.

FIG. 1 is a partially cut side view of an electric cable 1 according to the present invention, and FIG. 2 shows a radial cross section thereof. The electric power cable 1 comprises a metal conductor 2 surrounded by a conductor tape 4, which is optional in case the conductor is solid, and an electric insulation system 20 surrounding the conductor coaxially and radially outwards of the conductor 2. The insulation system 20 comprises an inner semi-conducting layer 10 surrounded radially outwards by an insulation layer 12. The insulation layer 12 is surrounded radially outwards by an outer semi-conducting layer 14. The inner semi-conducting layer 10, the insulation layer 12 and the outer semi-conducting layer 14 are preferably arranged so that the inner semi-conducting layer 10 and the insulation layer 12 are in contact with each other and such that the insulation layer 12 and the outer semi-conducting layer 14 are in contact with each other. There may be more than one insulation layer and there may be more than two semi-conducting layers in the insulation system, such as 1-4 insulation layers and 2-5 semi-conducting layers. The electric power cable 1 further comprises a first water blocking material 6, which is the inner water blocking material 6, arranged to surround the conductor 2 and the conductor tape 4 radially outwards and arranged between the insulation system 20 and the conductor 2. A first barrier layer 8, which is the inner barrier layer 8, is arranged as a diffusion hindering layer between the first, inner water blocking material 6 and the insulation system 20.

In the embodiment of FIGS. 1 and 2 the electric power cable further comprises an outer water blocking material 18, which is also referred to as a second water blocking material 18, arranged radially outwards from the insulation system 20 and a second barrier layer 16, which is the outer barrier layer 16, is arranged as a diffusion hindering layer between the insulation system 20 and the outer water blocking material 18. Thus, the first, inner, barrier layer 8 and the second, outer, barrier layer 16 encapsulate the insulation system 20.

The electric power cable 1 in FIGS. 1 and 2 is surrounded by an outer sheath 19.

Preferably, the inner 6 and the outer 18 water blocking materials comprise a water blocking tape. Since the water blocking tape is placed in contact with the conductor tape 4 and/or the outer semi-conducting layer 14, the water blocking tape should have semi-conducting property and comprises a water swellable material.

Figure 3:
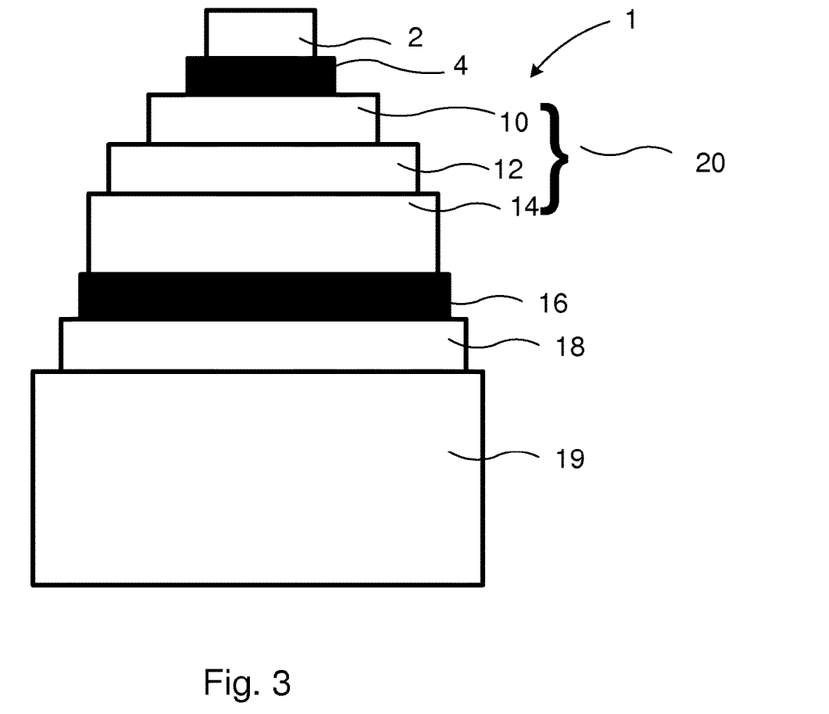
FIG. 3 is a side view of an electric power cable according to a second embodiment of the present invention.
Figure 4:
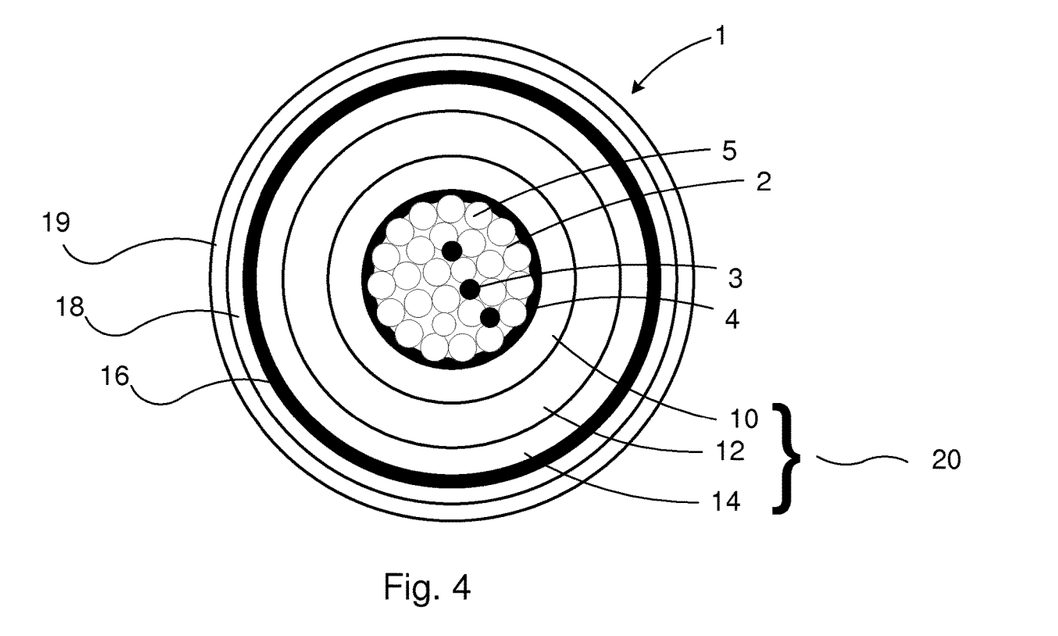
FIG. 4 is a cross-section of an electric power cable according to a second embodiment of the present invention.

In FIGS. 3 and 4 a further cable design according to the present invention is shown. FIG. 3 is a partially cut side view of an electric cable 1 according to an embodiment of the present invention, and FIG. 4 shows a radial cross section thereof. The electric power cable 1 comprises a metal conductor 2 and an electric insulation system 20 surrounding the conductor coaxially and radially outwards of the conductor 2 is shown. The conductor 2 comprises several strands 5 (only one is pointed at, FIG. 4). The insulation system 20 comprises an inner semi-conducting layer 10 surrounded radially outwards by an insulation layer 12 and the insulation layer 12 is surrounded radially outwards by a second, outer, semi-conducting layer 14. The electric power cable 1 further comprises an inner water blocking material 3 arranged in the conductor 2. The water blocking material is in form of a yarn 3 and is incorporated between the strands 5 in the conductor 2 and the yarn 3 is laid in the same direction as the strands 5 of the conductor, i.e. mainly in a longitudinal direction. The cable 1 further comprises an outer water blocking material 18 arranged radially outwards from the insulation system 20. A conductor tape 4 is arranged as a diffusion hindering layer between the inner water blocking material 3 and the insulation system 20. The conductor 2 is in direct contact with a conductor tape 4 and surrounded radially outwards by the conductor tape 4. An outer barrier layer 16 is arranged as a diffusion hindering layer between the insulation system 20 and the outer water blocking material 18.

Instead of being in the form of yarn, the first inner water blocking material 3 could be in form of a water absorbent powder arranged in the conductor as powder or the powder could be included in the conductor by means of a tape comprising the powder.

In the embodiment of FIGS. 3 and 4, the conductor tape 4 constitutes the first barrier layer which functions as a diffusion hindering layer.

Figure 5:
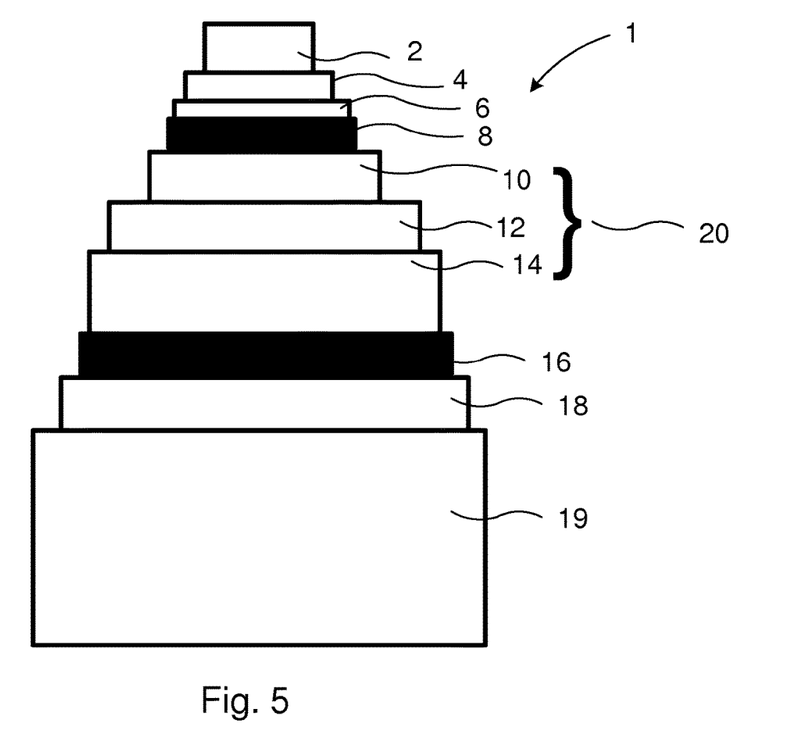
FIG. 5 is a side view of an electric power cable according to a third embodiment of the present invention.
Figure 6:
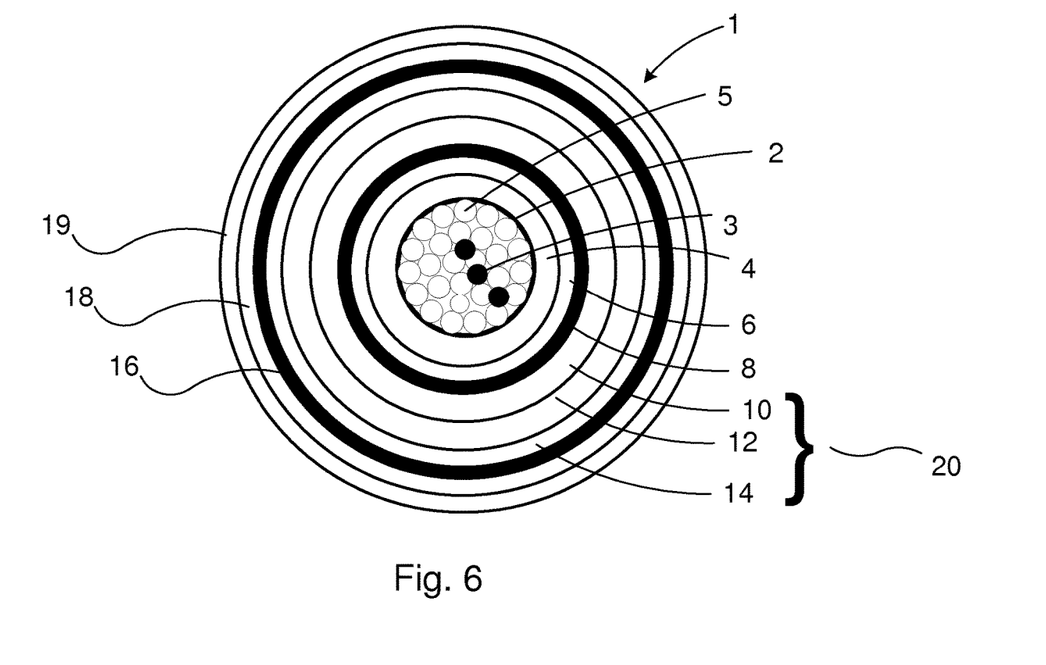
FIG. 6 is a cross-section of an electric power cable according to a third embodiment of the present invention.

In FIGS. 5 and 6 a further embodiment of the present invention is shown. Basically, the conductor 2 is similar to the conductor 2 shown in FIGS. 3 and 4. In the FIGS. 5 and 6 an electric power cable 1 comprising a metal conductor 2 and an electric insulation system 20 surrounding the conductor coaxially and radially outwards of the conductor 2 is shown. The conductor 2 comprises several strands 5 (only one is pointed at, FIG. 6). The yarn 3 comprises water absorbent material, such as SAP, and the yarn 3 is laid in the same direction as the strands 5 of the conductor, i.e. mainly in a longitudinal direction. In this embodiment however, the first inner water blocking material further comprises a water blocking tape 6, which surrounds the conductor 2 radially outwards. A conductor tape 4 is arranged to surround the conductor 2 radially outwards between the conductor and the water blocking tape 6. The water blocking tape 6 is surrounded radially outwards by an inner barrier layer 8 which functions as a diffusion hindering layer towards the insulation system 20. Further, the insulation system 20 comprises an inner semi-conducting layer 10 surrounded radially outwards by an insulation layer 12 and the insulation layer 12 is surrounded radially outwards by a second, outer, semi-conducting layer 14. The cable 1 further comprises an outer water blocking material 18 arranged radially outwards from the insulation system 20. An outer barrier layer 16 is arranged as a diffusion hindering layer between the insulation system 20 and the outer water blocking material 18.

The electric power cable 1 in FIG. 3-6 is surrounded by an outer sheath 19.

Figure 7:
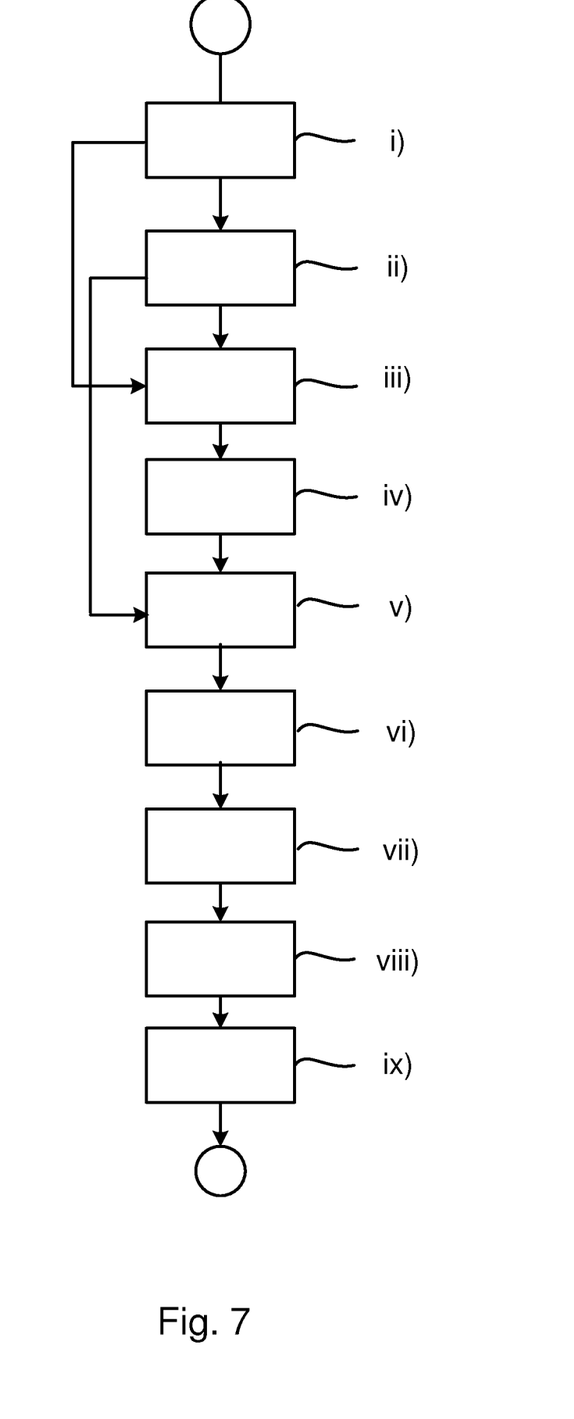
FIG. 7 shows flow charts showing the steps of a process for the production of the electric power cable according to the different embodiments of the present invention.

The process to manufacture the electric power cable is illustrated according to one embodiment of the invention in FIG. 7. The process for the production of an electric power cable comprises the steps of:

i) providing a conductor 2 optionally comprising a water-absorbent material 3;

ii) applying a conductor tape 4 to surround the conductor 2 radially outwards in case the conductor is stranded and optionally applying a conductor tape 4 to surround the conductor 2 radially outwards in case the conductor is solid;

iii) applying a water blocking tape 6 to surround the conductor 2 radially outwards in case the conductor 2 is not surrounded by a conductor tape and optionally applying a water blocking tape 6 to surround the conductor 2 radially outwards in case the conductor is surrounded by a conductor tape 4;

iv) in case a water blocking tape 6 is applied in step iii) applying an inner barrier layer 8 as a diffusion hindering layer radially outwards of the water blocking tape 6;

v) extruding an inner semi-conducting layer 10 comprising a base polymer and to surround the conductor radially outwards;

vi) extruding an insulation layer 12 comprising a base polymer to be in contact with the inner semi-conducting layer 10 and to surround the inner semi-conducting layer radially outwards;

vii) extruding an outer semi-conducting 14 layer comprising a base polymer, to be in contact with the insulation layer 12 and to surround the insulation layer radially outwards;

viii) applying an outer barrier layer 16 as a diffusion hindering layer radially outwards of the outer semi-conducting layer 14; and ix) applying an outer water blocking material 18 to surround the outer metallic layer 16 radially outwards.

The polymer preferably comprises a polyethylene-based polymer. A cross-linking agent can be added to the polyethylene-based base polymer prior to extrusion to enable cross-linking during for example curing procedure at an elevated temperature of about 150-350° C.

The extrusion may be performed by using any of the available common extrusion technologies, which are well known for the skilled person and not described in detail herein. The extrusion steps can be performed simultaneously or in sequence. To facilitate the control of the process, the extrusion steps are preferably performed simultaneously.

The process may further comprise a step of heat-treating and degassing the cable to remove cross-linking by-products. Heat treating and degassing may be performed during the production process when deemed necessary. The heat-treating may be performed in an oven or by using any other technology known in the art and apparent to the skilled person. In this way, the amount of by-products can be decreased.

The invention claimed is:

1. An electric power cable, which is a high voltage direct current cable, comprising:
a metal conductor and an electric insulation system surrounding the conductor coaxially and radially outwards of the conductor, wherein the insulation system includes an inner semi-conducting layer surrounded radially outwards by an insulation layer and wherein the insulation layer is surrounded radially outwards by an outer semi-conducting layer,
the electric power cable further having an inner water blocking material arranged to surround the conductor radially outwards and an outer water blocking material arranged radially outwards from the insulation system, the inner water blocking material and the outer water blocking material each including a water blocking tape, wherein an inner barrier layer is arranged as a diffusion hindering layer between the inner water blocking material and the insulation system and an outer barrier layer is arranged as a diffusion hindering layer between the insulation system and the outer water blocking material, wherein a density or compactness of the inner and the outer barrier layers is such that the inner and the outer barrier layers prevent diffusion of mobile chemical substances, and wherein the outer barrier layer is in contact with the outer semi-conducting layer;
wherein each water blocking tape has semi-conducting property and includes a water swellable material.

2. The electric power cable according to claim 1, wherein the inner barrier layer and the outer barrier layer are arranged to encapsulate the insulation system.

3. The electric power cable according to claim 2, wherein the conductor is stranded, and wherein a water-absorbent powder is arranged in the conductor as powder or included in the conductor by means of yarns or tapes.

4. The electric power cable according to claim 1, wherein the inner and/or the outer barrier layer includes a conductor tape or a metallic laminate.

5. The electric power cable according to claim 1, wherein the inner semi-conducting layer, the insulation layer and the outer semi-conducting layer has a polyethylene-based base polymer.

6. The electric power cable according to claim 5, wherein the polyethylene-based base polymer is cross-linked.

7. The electric power cable according to claim 1, wherein the electric power cable is a submarine cable.

8. An electric power cable which is a high voltage direct current cable, comprising:
a metal conductor and an electric insulation system surrounding the conductor coaxially and radially outwards of the conductor, wherein the insulation system includes an inner semi-conducting layer surrounded radially outwards by an insulation layer and wherein the insulation layer is surrounded radially outwards by an outer semi-conducting layer,
the electric power cable further having an inner water blocking material and an outer water blocking material that is arranged radially outwards from the insulation system, the outer water blocking material includes a water blocking tape, wherein an inner barrier layer is arranged as a diffusion hindering layer between the inner water blocking material and the insulation system and an outer barrier layer is arranged as a diffusion hindering layer between the insulation system and the outer water blocking material, wherein a density or compactness of the inner and the outer barrier layers is such that the inner and the outer barrier layers prevent diffusion of mobile chemical substances, wherein the outer barrier layer is in contact with the outer semi-conducting layer, and wherein the conductor is stranded and the inner water blocking material has a water-absorbent powder arranged in the conductor as powder or included in the conductor by means of yarns or tapes;
wherein the water blocking tape has semi-conducting property and includes a water swellable material.

9. The electric power cable according to claim 8, wherein the conductor is in direct contact with a conductor tape and surrounded radially outwards by the conductor tape.

* * * * *